(12) United States Patent
Callen et al.

(10) Patent No.: US 6,790,027 B1
(45) Date of Patent: Sep. 14, 2004

(54) TWO-SHOT, ROTARY THREE STATION INJECTION MOLD

(75) Inventors: Jeffrey E. Callen, Sussex, WI (US); Brian R. Hartlmeier, Elm Grove, WI (US); Theodore B. Lemke, Saukville, WI (US); Michael J. Wiedmeyer, Oconomowoc, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 255 days.

(21) Appl. No.: 09/819,365

(22) Filed: Mar. 28, 2001

(51) Int. Cl.[7] .............................................. B29C 45/06
(52) U.S. Cl. ...................................... 425/556; 425/572
(58) Field of Search ................................ 425/575, 576, 425/556, 572

(56) References Cited

U.S. PATENT DOCUMENTS

| | | | | |
|---|---|---|---|---|
| 4,243,364 A | * | 1/1981 | Rees et al. ................... | 425/153 |
| 4,351,629 A | * | 9/1982 | Farrell ......................... | 425/116 |
| 4,422,995 A | * | 12/1983 | Schad ......................... | 264/250 |
| 4,664,614 A | * | 5/1987 | De Rossi .................... | 425/185 |
| 5,067,891 A | * | 11/1991 | Julian et al. ................ | 425/533 |
| 5,518,392 A | * | 5/1996 | Tate et al. ................... | 425/538 |

* cited by examiner

Primary Examiner—Joseph Drodge
Assistant Examiner—Emmanuel S. Luk
(74) Attorney, Agent, or Firm—Quarles & Brady LLP

(57) ABSTRACT

A multi-shot injection mold utilizes a minimum of a first shot cavity and a second shot cavity for receiving injected molded plastic to produce a completed multi-component product. In conventional two shot molding, the injection of molten resin, cooling time of such resin, transportation of product to subsequent position and ejection of completed product requires a restrictive sequence. The invention allows flexibility in the sequence to gain efficiency within the molding cycle.

The invention uses a three position/station concept which allows each position to act independently of each other. The independent positions allow injection of first shot, injection of second shot and ejection of finished product to occur simultaneously. This effectively removes any additional cycle time required for ejection in the molding cycle.

Additionally, due to independent control of the three positions, the invention allows the ability to delay the ejection of finished product until after the injection of the subsequent first and second shot, thereby affording additional cooling time prior to ejection of the finished product. Generally, any of the three stations are able to operate while the mold is closed.

The invention further saves on overall cycle time by limiting the transport movement to 120° movement compared to the typical 180° movement.

9 Claims, 4 Drawing Sheets

TWO-SHOT, ROTARY THREE STATION INJECTION MOLD

FIELD OF THE INVENTION

This invention relates broadly to rotary injection molding of plastic components and, more particularly, pertains to an apparatus and method for injecting and ejecting plastic components in multi-shot injection molding of multi-colored or multi-material plastic parts.

BACKGROUND OF THE INVENTION

In conventional two-shot molding, the entire mold or portions of the mold are rotated. When the entire mold rotates, this is commonly referred to as the rotary platen technique. This rotation is achieved by a hydraulic cylinder or electric motor, which provides the means of movement for part transfer. This rotation typically would require 180° of rotation with other increments possible for additional shots or functions. This rotation is integrated with the movable platen of the machine and cooperates with a fixed metal mold mounted on the stationary platen.

To produce a two-shot plastic part, first one shot of material is injected into the mold, the mold then opens and the platen rotates the mold 180°, ejects the runners and the mold closes again. A second shot is then injected around the first shot to create a plastic part with two colors or materials. Simultaneously, the first shot is injected again. When the mold opens this time, both runners will eject along with the completed part. The mold will then rotate and close to repeat the cycle again. The rotary platen technique is frequently used because it permits parallel simultaneous injection of both shots. This results in relatively short cycle times, so that production is optimized.

In carrying out the aforedescribed two-shot cycle, it has been found that ejection of the completed part consumes a disproportionate amount of time. Given the fact that the standard injection molding apparatus runs continuously, the time required for the ejection of the completed part over numerous repeated cycles seriously effects overall production.

Accordingly, it is desirable to shorten the time of a conventional two-shot injection molding cycle by having independent control of injection and/or ejection in each respective portion of the mold. That is, the invention contemplates the injection of first and second shots, which can occur independently or simultaneously from each other without regard to ejection of the finished product. The invention allows simultaneous key injection of materials and the ejection of finished product within the molding cycle.

SUMMARY OF THE INVENTION

It is a general object of the present invention to provide an injection mold having a high speed, rotary indexing plate assembly used in manufacturing multi-color or multi-layer products.

It is one object of the present invention to provide a three-position, rotary indexing plate assembly which will permit simultaneous injecting and ejecting of plastic components.

It is also an object of the present invention to provide a multi-shot molding process wherein plastic components are transferred among three processing stations in a continuous manner which will improve production.

It is a further object of the present invention to provide a rotary indexing plate assembly driven by a hydraulic cylinder (but not limited to) and traveling along a circular path in 120° increments.

It is another object of this present invention to provide a rotary index plate assembly for enabling independent or simultaneous filling of first and second cavities without regard to ejection of the finished product.

In one aspect of the invention, a multi-shot injection mold has at least a first shot cavity and a second shot cavity for receiving injected plastic material to form a completed plastic part which is ejected. The invention is improved by means of an indexing plate rotatably mounted on the injection mold for injecting the first shot cavity and the second shot cavity prior to ejection of the completed plastic part. The injection mold is provided with at least an initial first shot cavity and a second shot cavity and an ejector station. The indexing plate assembly positions common core pins, each of which is selectively cooperable with the first shot cavity, the second shot cavity and the ejector station. The indexing plate is rotatable in 120° increments. The injection mold includes a hydraulic cylinder (but not limited to) for incrementally advancing the indexing plate. The injection mold is also equipped with an extension plate having a pair of guide bars with stops fixed thereon and an ejector plate is slidably mounted on the guide bars. The ejector plate includes an ejector cradle for stripping completed plastic components from the core pins. A limit switch is used to control the travel of the ejector plate. The completed plastic components are preferably in the form of over-molded pen barrels.

In another aspect of the invention, a rotary indexing plate assembly is used in producing multi-shot plastic components. The assembly includes a support plate having a first shot cavity and a second shot cavity fixed thereon for receiving plastic injection material to form a first shot and a second shot part, respectively. An ejector station includes an ejector plate having an ejector cradle slidably mounted relative to a portion of the support plate. An indexing plate is rotatably mounted on the support plate, the indexing plate having a first core retainer, a second core retainer, and a third core retainer, each retainer holding common core pins being selectively alignable with the first shot cavity, the second shot cavity and the ejector station. With this construction, when plastic material fills the first shot cavity and the second shot cavity, completed plastic components can be simultaneously removed via the ejector system. The indexing plate is rotatable incrementally to move the first shot part from the first shot cavity to the second shot cavity, move the second shot part from the second shot cavity to the ejector station and move the core pin from the ejector station to the first shot cavity.

In yet another aspect of the invention, there is contemplated a method for producing a two-shot plastic component. The method includes the steps of providing a fixed injection mold having a support plate equipped with a first shot cavity for holding a first shot component, a second shot cavity for holding a second shot component, and an ejector station for removing a two-shot plastic component; providing an indexing plate rotatably mounted to the support plate and having a first core retainer, a second core retainer, and a third core retainer, each of which is selectively alignable with the first shot cavity, the second shot cavity and the ejector station; injecting plastic material into the first shot cavity and the second shot cavity; rotating the indexing plate to move the first shot part to the second shot cavity, move the second shot part to the ejector station and move the third core retainer to the first shot cavity; and further injecting plastic material into the first shot cavity and the second shot cavity regardless of the removal of the two-shot plastic component from the ejector system.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
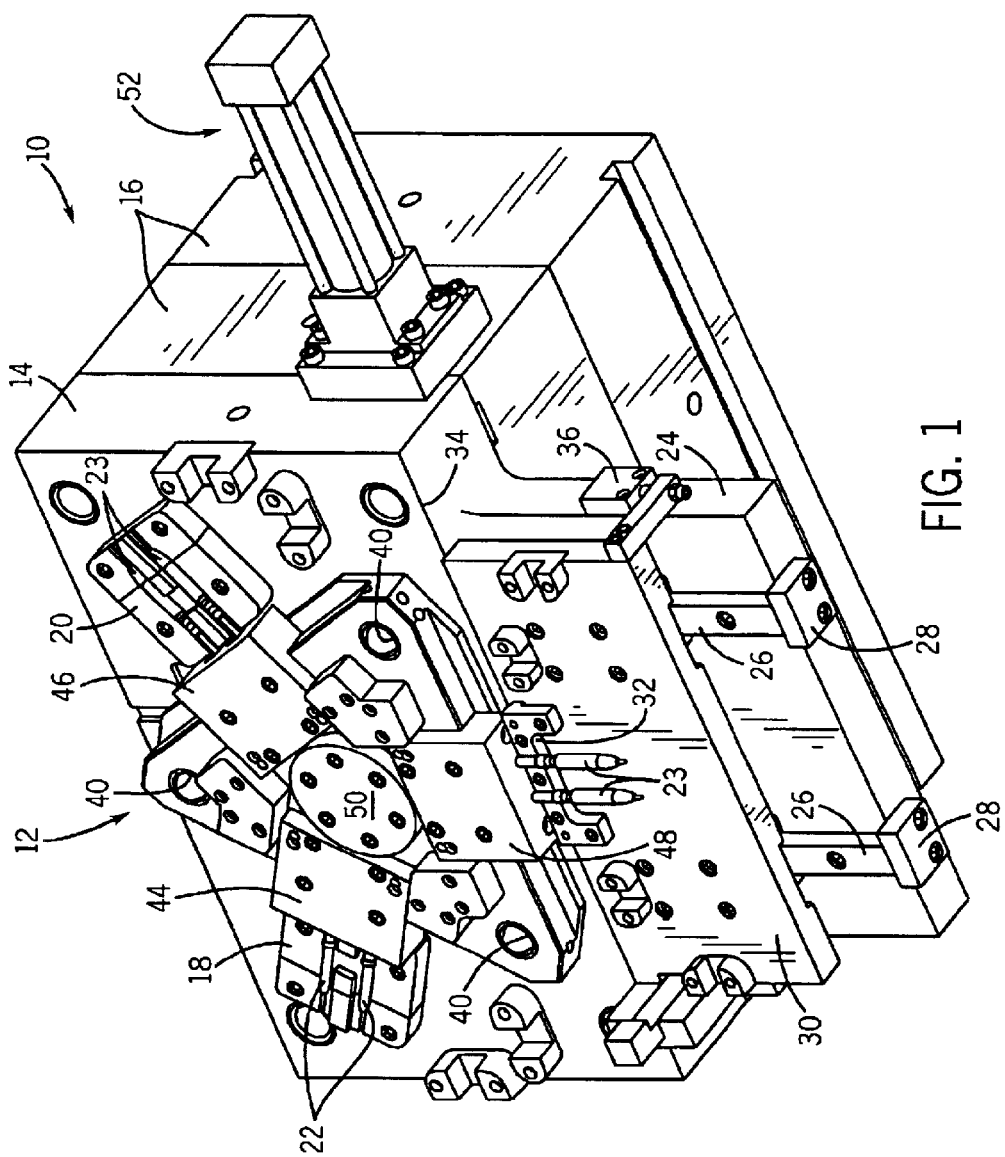
FIG. 1 is perspective view of a rotary indexing plate assembly embodying the present invention.

Referring now to FIG. 1, a rotary indexing plate assembly embodying the invention and adapted to support a mold used in multi-shot injection molding is generally identified by the reference numeral 10. The multi-shot injection assembly 10 is compromised of a rotatable, three-station indexing plate assembly 12 supported on a non-rotatable "B" plate 14 and a transmission plate 16. As is well known, the multi-shot injection assembly 10 forms the movable ejector half of the mold which cooperates (i.e. opens and closes) with a fixed complementary half. In the preferred embodiment, the multi-shot injection assembly 10 is conveniently employed to produce over-molded, sleeve-like, pen barrels used in producing writing instruments, but it should be understood that the assembly 10 may also be utilized in producing other multi-color or multi-layered plastic components.

Figure 2:
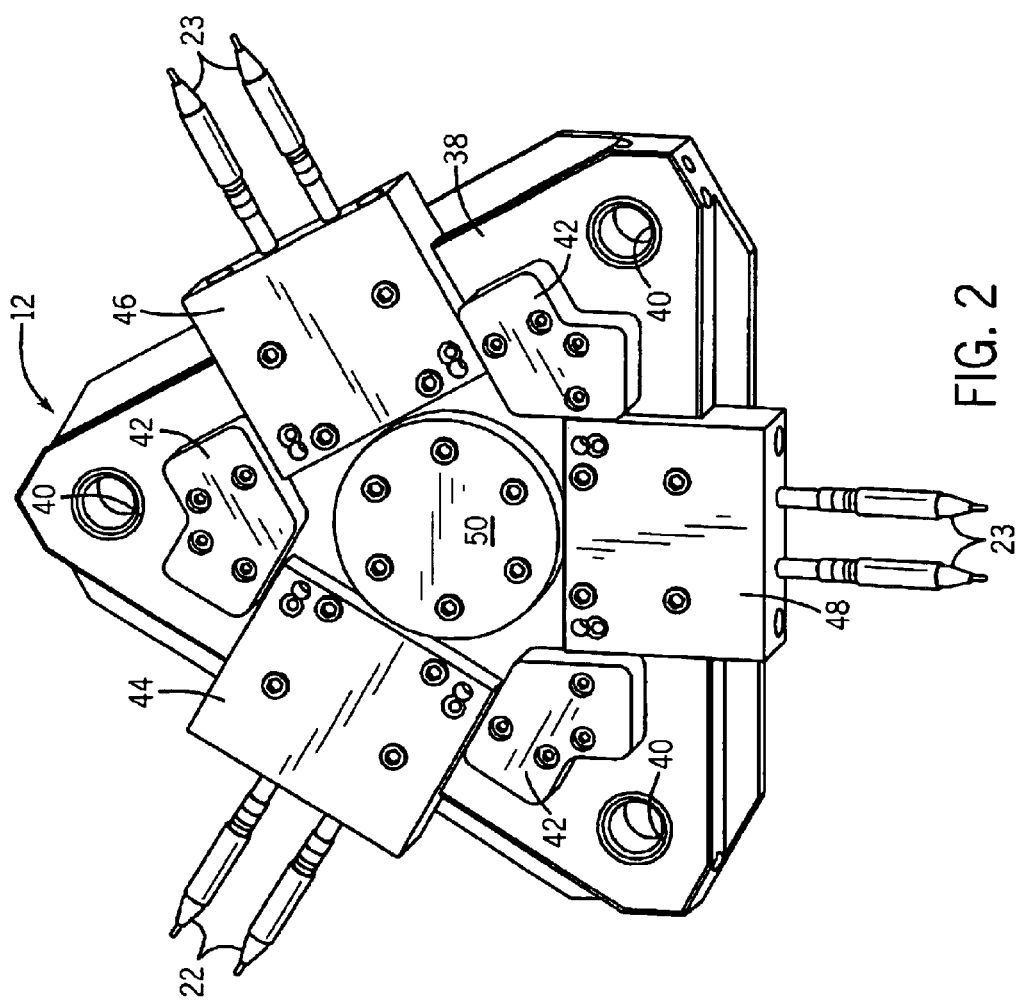
FIG. 2 is a plan view of the rotary indexing plate.

The "B" plate 14 defines a mounting surface for a pair of spaced apart mold cavities, namely, a first shot cavity 18 and a second shot cavity 20, each of which accommodates a pair of first shot and second shot pen barrels 22, 23, respectively. The "B" plate 14 is provided with an extension 24 having a pair of guide bars 26 and end stops 28 secured thereon. An ejector plate 30 carries an ejector cradle 32 shaped for receiving completed plastic components in the form of, for example, a pair of over-molded pen barrels 23. Together, ejector plate 30 and the injector cradle 32 define an ejector station. The ejector plate 30 is movably mounted relative to the "B" plate 14, such that it will slide back and forth along the guide bars 26 between an edge 34 of the "B" plate 14 (starting position) and the stops 28 (finishing position) when it is desired to discharge the completed pen barrels into a repository on the molding machine. A limit switch 36 is mounted on the "B" plate extension 24 and is used to restore the ejector plate 30 to its starting position as shown in FIG. 1. With reference to FIG. 2, the rotatable indexing plate assembly 12 has a generally triangular base 38 provided with a series of guide bushings 40. Three water manifolds 42 are used to provide water cooling of the assembly 10 during the molding process. The indexing plate assembly 12 includes a set of three equidistantly spaced core retainers, 44, 46, 48 respectively, (each having core pins) which together with the triangular base 38 are mounted for rotation on a center hub and rotating shaft 50. Although not shown, the shaft 50 carries a pinion gear which is engageable with a toothed rack attached to a piston rod of a hydraulic cylinder 52 mounted on the transmission plate 16, as shown in FIG. 1. Extension and retraction of the piston rod of cylinder 52 will cause the indexing plate assembly 12 to rotate in 120° increments, such that the core retainers 46, 48 and their common core pins will be operatively aligned with molding cores in the first and second shot cavities 18, 20 and the ejector cradle 32.

In conventional two-shot molding, a rotatable platen assembly, such as disclosed in the assignee's copending U.S. patent application Ser. No. 09/589,823, filed Jun. 7, 2000, provides an over-molded, finished plastic part over al cycle time of approximately eighteen seconds, as depicted diagrammatically in FIG. 3. That is, the rotary platen assembly permits controlled movement of a rotary plate and its mold through an accurate path to align openings in the mold to different injection nozzles, discharging polymers of various colors and/or materials in order to produce classic components of various colors and/or materials.

Figure 3:
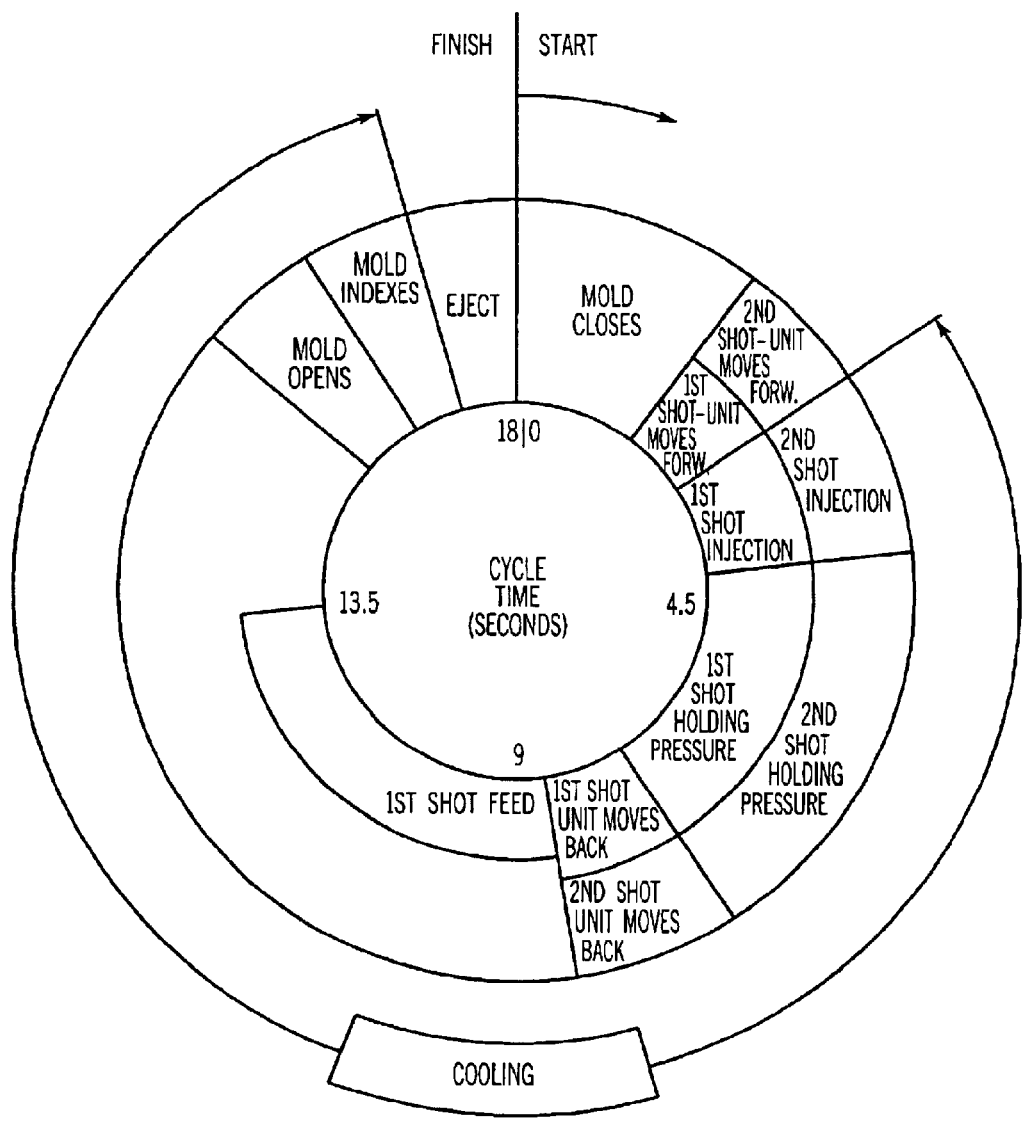
FIG. 3 is a diagram representing a typical cycle for conventional two-shot molding.

To produce a two-shot plastic part, according to FIG. 3, first one shot of the material is injected into the mold, then the mold opens and the platen rotates the mold 180°, ejects the runner and the mold closes again. A second shot is then injected around the first shot to create a plastic part with two colors or materials. Simultaneously, the first shot is injected again. When the mold opens this time, both runners will eject along with the completed part. The mold will then rotate and close to repeat the cycle again. The cooling period begins with the filling (injection) process and ends with removal or ejection of the completed part from the mold. This period is adjusted to bring the molded part to a certain final temperature, thus stabilizing its form. In analyzing the overall cycle time expended in conventional two-shot molding, it has been determined that ejection of the completed plastic part which occurs after the mold cavities have been filled, consumes about three seconds in the overall eighteen second cycle. Production could be further improved if the time expended for the part ejection could be reduced or eliminated.

In accordance with the present invention, the multi-shot injection assembly 10 is constructed and arranged such that the injection of first and second shot materials can occur independently or simultaneously with respect to each other without regard to ejection of the finished product. The invention allows simultaneous injection of materials and ejection of finished product within the molding cycle.

Figure 4:
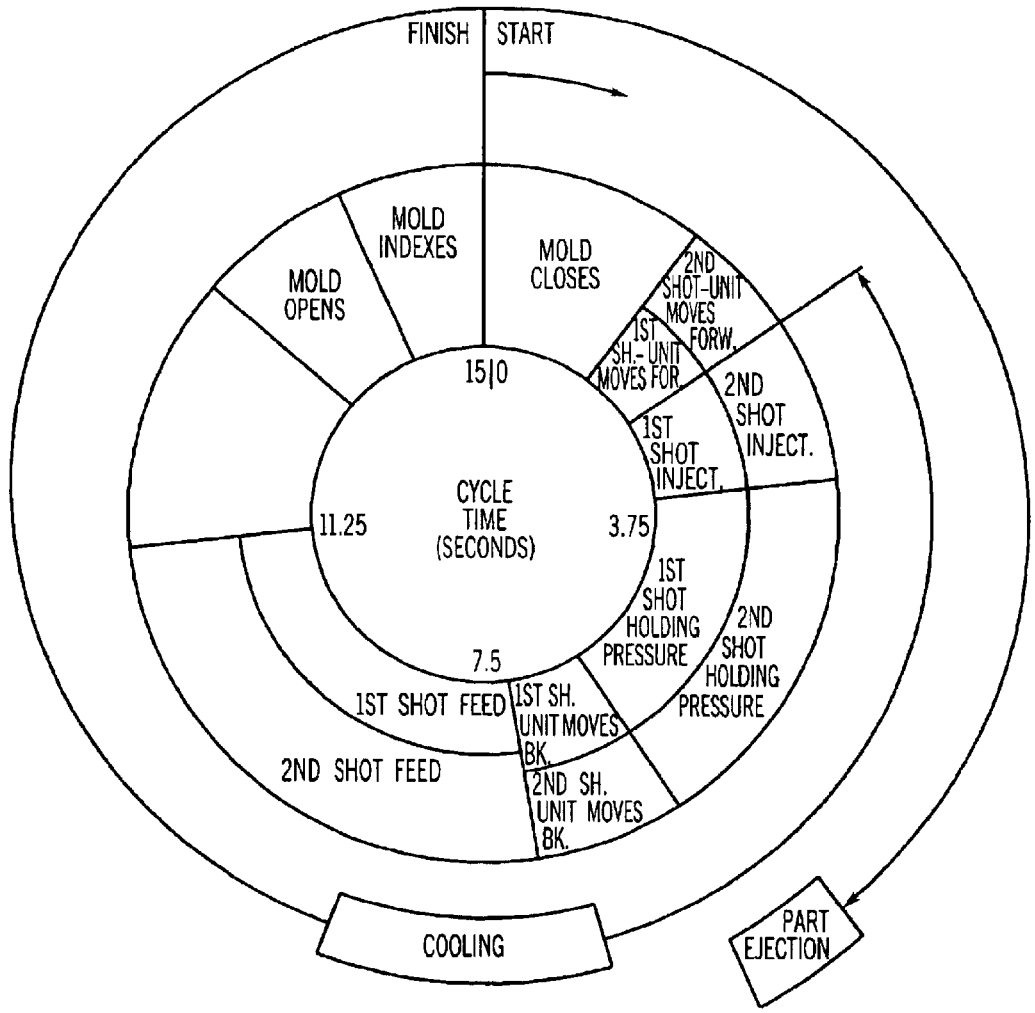
FIG. 4 is a diagram representing a typical cycle for two-shot molding using the rotary indexing plate assembly of the present invention.

To produce a two-shot plastic part using the present invention, as shown in FIG. 4, first and second shots of material are injected into the mold, the mold then opens and the indexing plate rotates forwardly 120° by extension of the piston rod of the hydraulic cylinder 52. When rotation occurs, the first shot parts 22 move to the second shot cavity 20, the second shot parts 23 move to the ejector cradle 32, and the core retainer 48 from the ejector station moves to the first shot cavity 18. The piston rod of the hydraulic cylinder 52 is then retracted and the mold closes. The injection then occurs in the first and second shot cavities 18, 20, independently or simultaneously as the completed parts 23 are stripped from the core pins in the ejector station. The invention thus permits, although not limited to, simultaneous injection and ejection. The cooling period extends from the time of first and second shot injection until the removal of finished product. The cooling process is effected by means of the water manifolds 42 and related structure in the assembly 10. It should also be understood that ejection may also occur after injection of the subsequent first and second shots.

Using the rotary indexing plate assembly 10 enables a two-shot cycle to occur in approximately fifteen seconds.

The three second savings in cycle time provides a measurable leap in production efficiency as compared with the two-shot molding process described above.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

Various alternatives and embodiments are contemplated as being within the scope of the following claims particularly pointing out and distinctly claiming the subject matter regarded as the invention.

We claim:

1. In a multi-shot mold having at least a first shot cavity and a second shot cavity for receiving injected plastic material to form a completed plastic part which is ejected, the improvement comprising:

an indexing plate rotatably mounted on the injection molder injecting the first shot cavity and second shot cavity prior to ejection of the completed plastic part;

wherein the injection molding machine is provided with at least a first shot cavity and a second shot cavity and an ejector station;

wherein the ejector station provides a stripper plate separate from the indexing plate to remain rotationally fixed during rotation of the indexing plate, the stripper plate engaging a molded part at the ejection station to remove the molded part; and wherein the stripper plate is a cradle that grips a side of the molded part along an axis of movement perpendicular to a plane of rotation of the indexing plate and then moves along the plane of rotation to eject the part.

2. The improvement of claim 1, wherein the indexing plate has a first core retainer, a second core retainer, and a third core retainer, each of which is selectively cooperable with the first shot cavity, the second shot cavity and the ejector station.

3. The improvement of claim 1, wherein the indexing plate is rotatable in 120° increments.

4. The improvement of claim 1, wherein the injection molding machine further includes a means for incrementally advancing the indexing plate.

5. The improvement of claim 1, wherein the injection mold is equipped with an extension plate having a pair of guide bars with stops fixed thereon and an ejector plate is slidably mounted on the guide bars.

6. The improvement of claim 5, wherein the ejector plate supports the stripper plate for stripping completed plastic components from the indexing plate.

7. The improvement of claim 5, including a limit switch for controlling the travel of the ejector plate.

8. The improvement of claim 1, wherein the completed plastic components are in the form of over-molded pen barrels.

9. The improvement of claim 1 wherein the stripper plate engaged the molded part from a direction perpendicular to a plane of rotation of the indexing plate;

in a multi-shot mold having at least a first shot cavity and a second shot cavity for receiving injected plastic material to form a completed plastic part which is ejected, the improvement comprising:

an indexing plate rotatably mounted on the inaction molder injecting the first shot cavity and second shot cavity prior to ejection of the completed plastic part;

wherein the injection molding machine is provided with at least a first shot cavity and a second shot cavity and an ejector station;

wherein the ejector station provides a stripper plate engaging a molded part at the ejection station to remove the molded part;

wherein the stripper plate engages the molded part from a direction perpendicular to a plane of rotation of the indexing plate.

* * * * *